United States Patent [19]

Lucht et al.

[11] Patent Number: 5,045,877
[45] Date of Patent: Sep. 3, 1991

[54] PHOTOGRAPHIC PRINTER

[75] Inventors: Orren J. Lucht, 1481 240th St., Farmington, Minn. 55024; Charles R. Lucht, Bloomington; Wayne D. Gunderson, Plymouth, both of Minn.

[73] Assignee: Orren J. Lucht, Farmington, Minn.

[21] Appl. No.: 483,073

[22] Filed: Feb. 21, 1990

[51] Int. Cl.$^5$ .............................................. G03B 27/72
[52] U.S. Cl. ........................................ 355/71; 355/55
[58] Field of Search ...................... 355/50, 51, 54, 71, 355/67, 38, 55

[56] References Cited

U.S. PATENT DOCUMENTS

| | | | |
|---|---|---|---|
| 2,482,571 | 9/1949 | Arnold | 354/195.12 |
| 3,169,441 | 2/1965 | Johnson | 355/54 |
| 3,292,485 | 12/1966 | Mey | 355/54 |
| 3,684,371 | 8/1972 | Weisglass et al. | 355/71 |
| 3,689,149 | 9/1972 | Livingood | 355/54 X |
| 3,826,571 | 7/1974 | Spence-Bate | 355/46 |
| 3,831,021 | 8/1974 | Muhlogger | 35/71 X |
| 3,874,792 | 4/1975 | Turner | 355/67 |
| 3,887,279 | 6/1975 | Rurin | 355/38 |
| 3,914,721 | 10/1975 | Pollock | 355/35 |
| 3,927,941 | 12/1975 | Yamaguchi | 355/71 |
| 3,951,545 | 4/1976 | Lucht | 355/71 X |
| 4,027,968 | 6/1977 | Spence-Bate | 355/46 |
| 4,125,315 | 11/1978 | Altman et al. | 350/96.10 |
| 4,168,904 | 9/1979 | Furukawa | 355/71 |
| 4,183,075 | 1/1980 | Hengst | 362/6 |
| 4,432,636 | 2/1984 | Tarsia | 355/35 |
| 4,583,845 | 4/1986 | Lucht et al. | 355/46 |
| 4,931,826 | 6/1990 | Lucht et al. | 355/28 |
| 4,947,207 | 8/1990 | McGuire | 355/71 |

Primary Examiner—Richard A. Wintercorn
Attorney, Agent, or Firm—Merchant, Gould, Smith, Edell, Welter & Schmidt

[57] ABSTRACT

A photographic printer 20 is disclosed for projecting an image carried by a negative to a light sensitive medium 40. The apparatus 20 includes a novel mixing chamber 24, lens carrier 35, and light sensitive web material reel 39, 47. The mixing chamber 24 includes four walls 103a–103d defining a volume and oriented relative to one another wherein the edge of one wall 103 is proximate the face of an adjacent wall 103. This orientation daisy chains around the volume whereby the walls 103 may be moved relative to one another to continuously change the volume so as to correspond to various size negatives and/or masks. The lens stack 35 includes a plurality of concentric shafts 126–131 arranged about a solid shaft 125 with each concentric shaft 126–131 being rotatable separately from the other concentric shafts 126–131. A deck 14–145 is cooperatively attached to each concentric shaft 126–131 with each deck 140–145 having a plurality of lens carriers 55 connected thereto. The lens carriers 55 are thereby individually incremented into the light path 22 to focus the image from the negative onto the light sensitive material 40. The take-up reel 39, 47 includes a first end plate 209 which is fixedly attached to a tube 211 and a second end plate 210 which is biased away from a tube retention device 214 toward the first end plate 209. In this manner, web material 40 which is slightly larger or smaller than the intended nominal size is positively referenced against the first end plate 209.

3 Claims, 7 Drawing Sheets

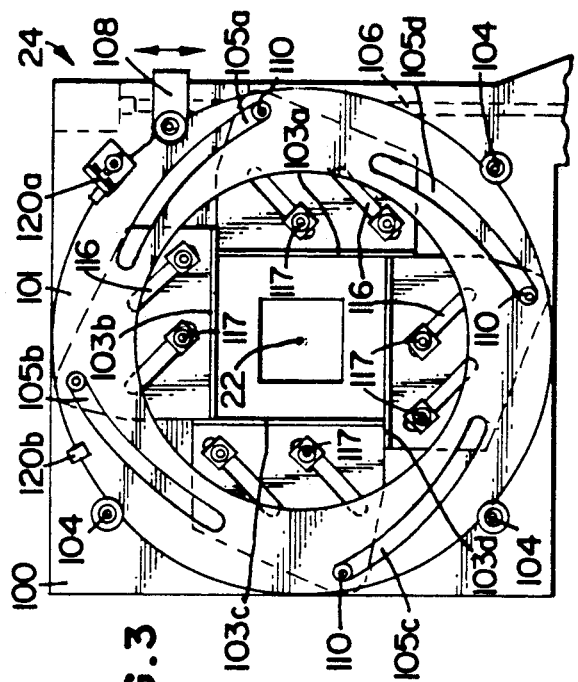
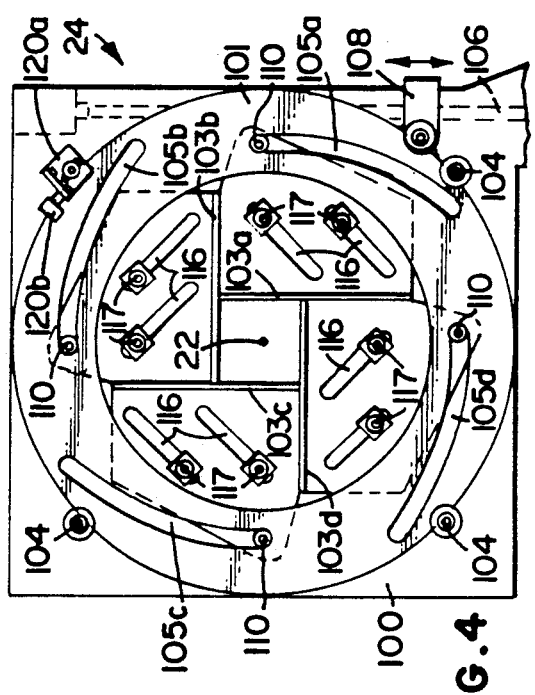
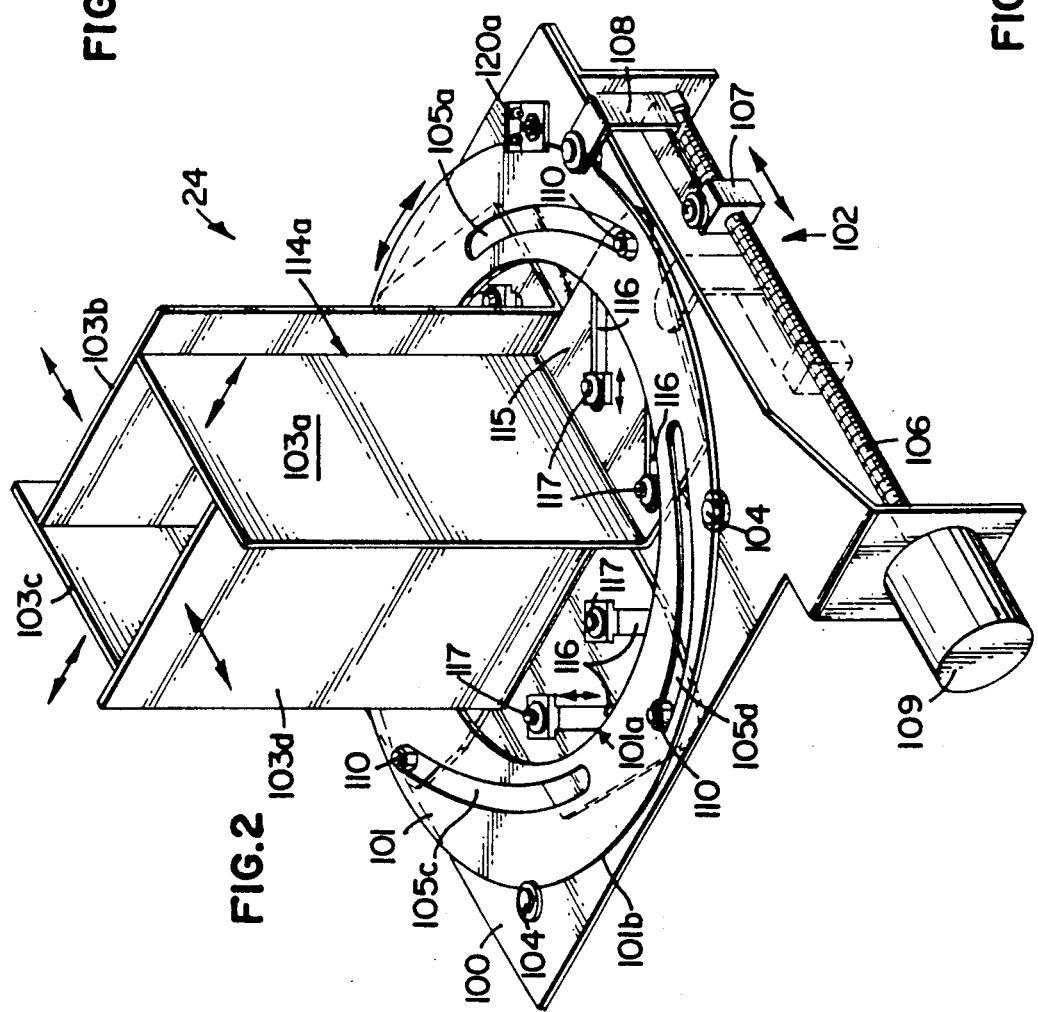

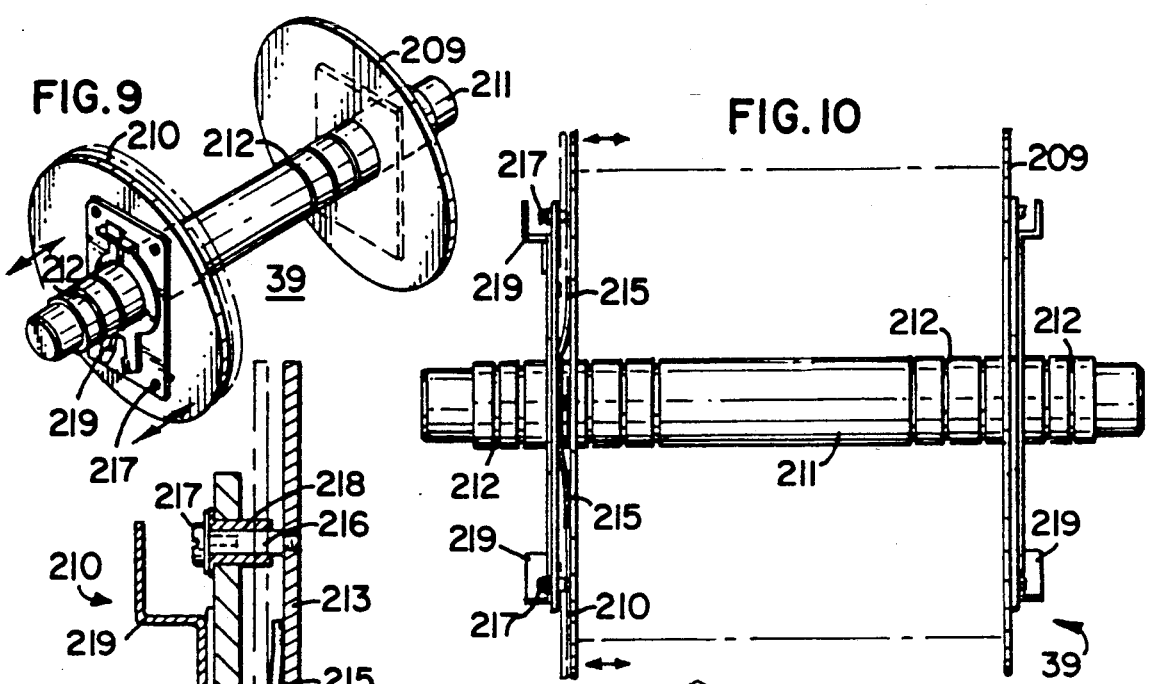
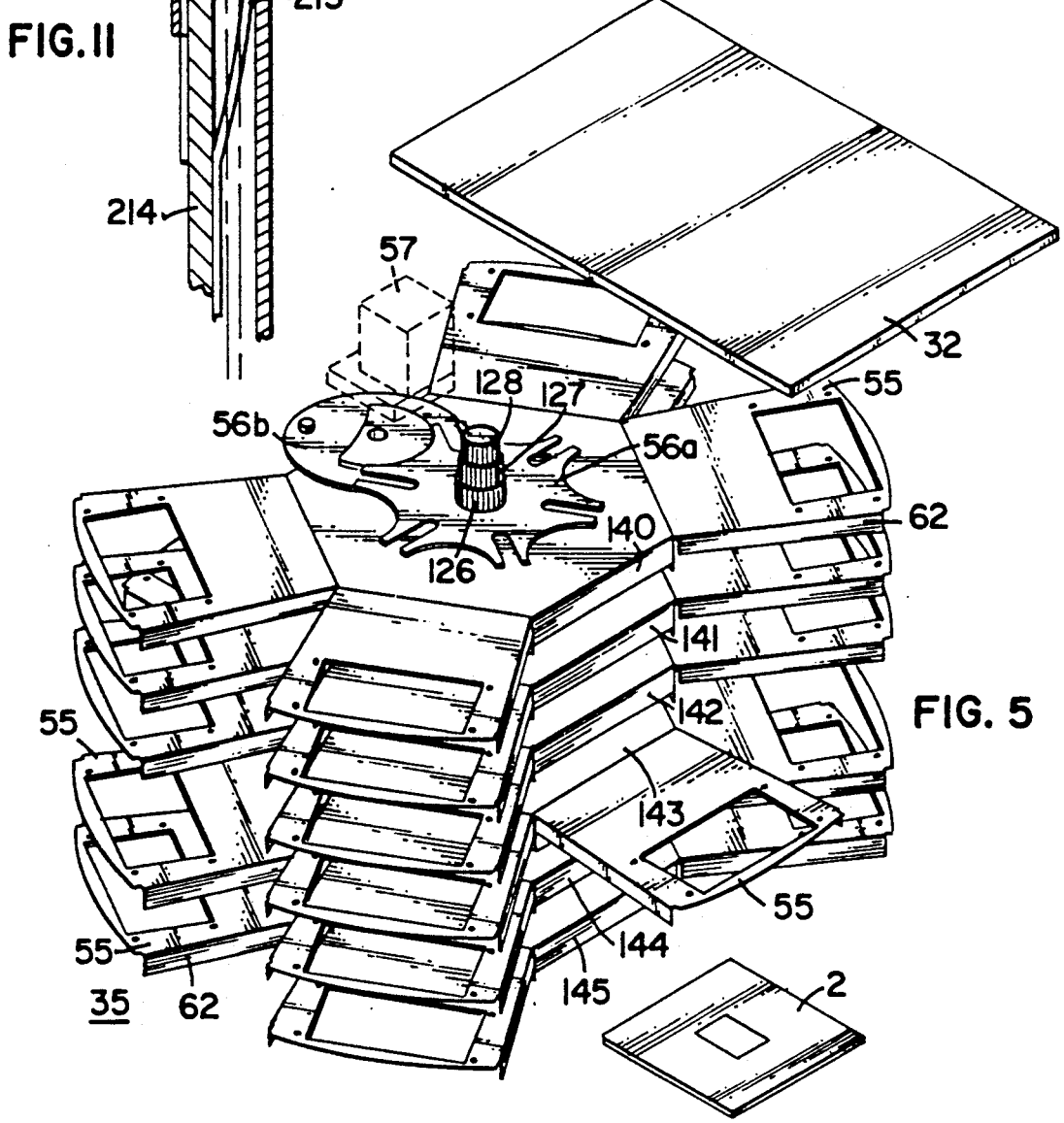

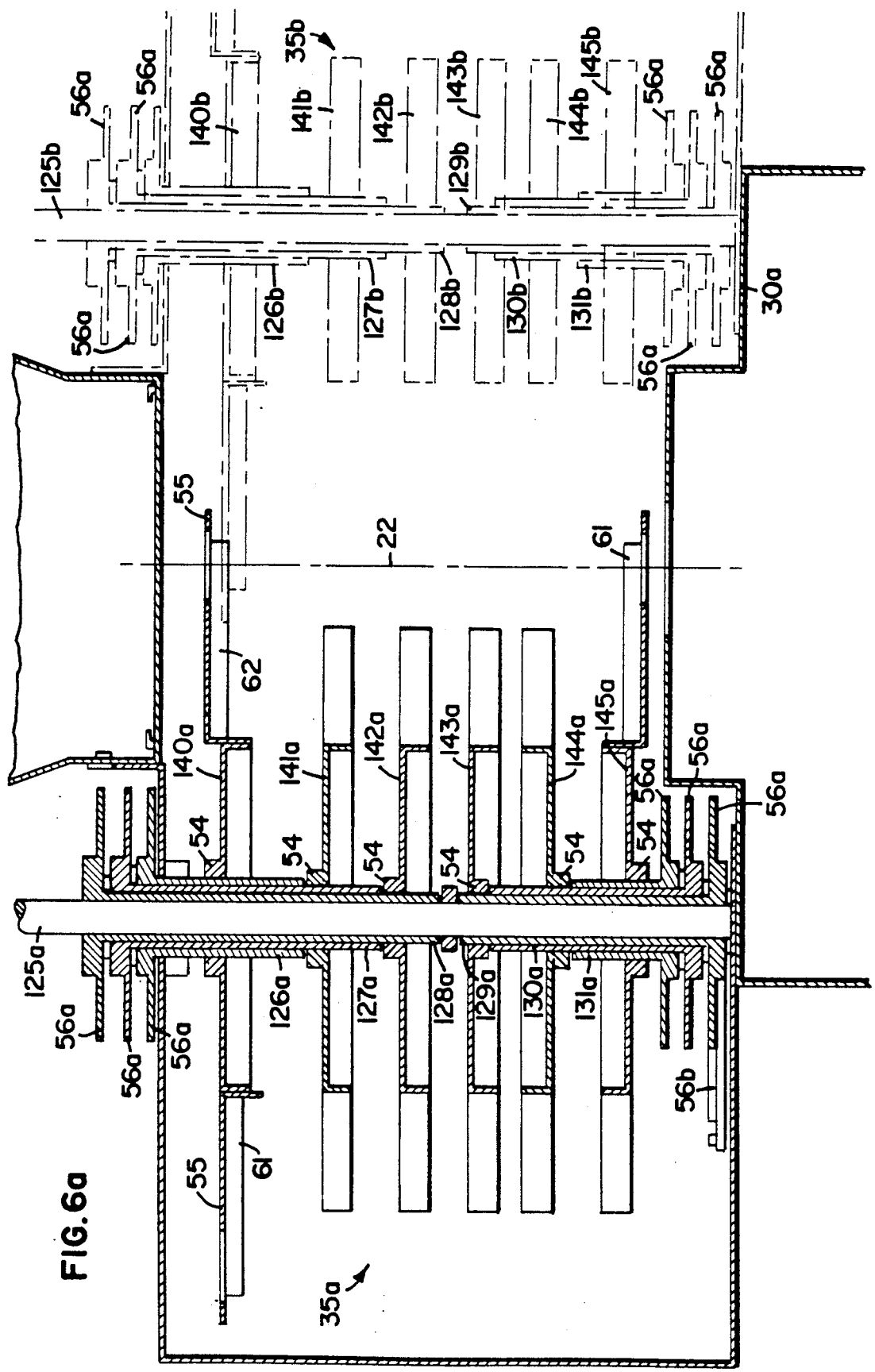

PHOTOGRAPHIC PRINTER

FIELD OF THE INVENTION

The present invention relates generally to photography, and more specifically to an apparatus for printing images on a light sensitive medium.

BACKGROUND OF THE INVENTION

A two step process is utilized in order to create a finished photograph from a negative. First, the image on the negative is projected onto a light sensitive medium. This portion of the procedure utilizes a printer. Subsequent to the light sensitive medium being exposed to the light projected from the negative, the medium is then processed in a known manner. This portion of the procedure utilizes a processor.

The printer apparatus typically includes a diffusion light head or a light mixing chamber which is used in connection with a white light source. The light is passed through the negative subsequent to the mixing chamber. A lens, or group of lenses then magnify the image from the negative onto a platen. The platen holds the light sensitive medium during the printing process.

For a more detailed description of a printer and a processor, reference may be had to commonly assigned application Ser. No. 07/278,668, titled Photographic Printer-Processor, which is hereby incorporated by reference.

While printers are known in the art, there are several drawbacks associated with their use. Several drawbacks include the types of mixing chambers available, the lens arrangements, and the light sensitive medium supply/take-up holding devices.

As noted, typically, mixing chambers are resident in printers between the light source and the negative. The light source is generally a white source (i.e., the source emits a full spectrum of colors so as to appear "white") and, if color printing, a number of color correction filters are provided between the light source and the negative. The color filters are provided in order to adjust the chromaticity as necessary to provide the desired color mix. As is well known in the art, the color correction filters are selectively moved into a portion of the light beam to adjust for color printing. A portion of the beam is thereby colored. It will be appreciated that the interposition of the color filter affects not only the color of that portion of the beam, but also the light flux through that portion. The mixing chamber is therefore interposed between the color filter (so as to accept the light) and the negative. The mixing chamber "scrambles" the light which enters the chamber and provides a homogeneous mix of light at the chamber's exit port. By homogeneous mixture, what is meant is both a uniform mixture of color and light flux.

Those skilled in the art will appreciate that it is desireable to minimize exposure times and that to do so requires a maximization of flux upon the negative. However, as negative sizes vary, the exit port of the mixing chamber will either be too small or too large relative to the negative. Therefore, only the largest negatives are uniformly illuminated and with a maximum degree of efficiency. For example, if the same size chamber is utilized with a large negative as a smaller negative, then a portion of the light is in essence blocked with an opaque mask when used with the smaller negative (i.e., the opaque mask is that portion of the negative mask-/holder for the smaller negative). The loss of light results in a longer (relatively speaking) projection time.

In order to avoid such a result, typically, prior mixing chambers were made to be manually interchangeable so as to provide for variously sized exit ports which correspond to negative sizes. However, interchanging mixing chambers requires the interruption of the printing process and requires additional expense and storage.

U.S. Pat. No. 3,874,792 disclosed a two-sized mixing chamber by providing a pyramid shaped chamber, wherein a portion of each side wall hinged inwardly to form an interior rectangular chamber. Therefore, there was a first size corresponding to the base of the pyramid and a second size corresponding to the rectangular interior chamber. However, this device suffers from the drawback that it is inherently limited to two sizes. Therefore, there is a need for an adjustable mixing chamber which may be changed to correspond to variously sized negatives.

The second drawback of current printer devices is that many printers accommodate only a single lens so that the possible print sizes are limited. In printers which enable multiple lenses to be used, changing lenses can be a complicated process. The arrangement for holding the various lenses, such as a lens drawer system, can be quite complex and heavy and may require manual operation. Further, while lens "carousels" are known in the art, they typically include a single disk wherein the mean plane formed by the disk intersects the optical axis of each of the lenses held by the carousel. This arrangement necessarily limits both the number of lenses held by the carousel and the focal lengths of the lenses which might be used.

U.S. application No. 07/278,668, incorporated by reference above, discloses an arrangement of lenses which are both offset and staggered about a single axis of rotation. The lenses may be selectively rotated about the axis of rotation and into the light path. This provides for selecting lenses with differing focal lengths, but does not provide for a large group of lenses. Therefore, there is a need for an apparatus which provides for a large group of lenses and for lenses of differing focal lengths.

The third drawback of current printer devices is the lack of registration, or a solid reference point, for the edge of the supply web of light sensitive medium. Present printers typically utilize light sensitive paper which is in a web form, usually being provided in rolls of stock. However, while the web material has a nominal width, the variance allowed by the web material manufacturers oftentimes results in an undersized roll. Present printers do not accommodate for such variations. The result is a "serpentining" or wavering of the roll back and forth between the two ends of the supply roll holder. This may result in a similar serpentine result of the material as it passes over the platen during exposure. Therefore, there is a need for an apparatus which positively guides the web material and provides a solid reference despite a variance of nominal width.

SUMMARY OF THE INVENTION

The present invention provides for a reliable method and apparatus for printing light sensitive material. In a preferred apparatus constructed according to the principles of the present invention, a controller determines the negative size to be developed and adjusts the mixing chamber so as to maximize the light provided to the negative by adjusting the size of the exit port relative to the negative. The controller also selects a bank of lenses which are utilized for the desired size print. Further, light sensitive web material is registered by being biased against a reference so as to eliminate any wavering of the material through the exposure station (i.e., the platen). In this manner, the efficiency of the process of exposing the light sensitive medium is maximized. The apparatus also includes several other features which enhance its efficiency, utility and accuracy of the printing process.

In a preferred embodiment of the apparatus, negatives to be printed are inserted into a negative holder located on a negative carrier within the apparatus. A shutter is located above the negative holder to allow the light source to be on without exposing the light sensitive medium. A color sensor is used in combination with the controller to correct for chromaticity (i.e., by moving color correction filters into the path of the light beam). The controller also is arranged and configured so as to actuate the continuously adjustable mixing chamber to correspond to the size negative being printed. Those skilled in the art will recognize that a negative may be masked to a different size. Therefore, preferably the controller responds to the mask size to determine the various printing parameters.

Preferably, the mixing chamber has four walls that are cooperatively located on a ring. The ring has a series of first slots formed therethrough. The first slots slideably engage first pegs which are cooperatively attached to the four walls. Second pegs are located on the interior of the ring and slideably engage the walls through second slots.

Each of the walls are arranged such that one edge of each wall is proximate the face of an adjacent wall. The interior portion of the walls are a highly reflective surface although they might also be coated with white paint, or a mirror, to aid in mixing the light. In operation, by turning the ring, the four walls slide in and out relative to the ring while maintaining a closed, but varying, light mixing chamber volume and exit port.

The controller also selects the lenses which will be utilized in exposing the negatives. One or more lens stacks are provided with each stack having a plurality of lens decks arranged about a common central axis. Each deck, however, is secured by an individual rotatable concentric shaft, such that rotation of one shaft does not necessitate rotation of the others.

Each lens deck includes holders for a plurality of lenses, with each of the lenses on an individual deck being generally maintained in, or proximate to, a single plane transverse to the optical axis of the lenses. With this configuration, it is possible to use lenses/optical elements from different decks having a wide range of focal lengths. The lens decks are arranged and configured such that each lens deck has one or more first positions which is not within the path of light, and one or more second positions whereby the light path intersects a lens.

The lens stack may be used either individually or with a second lens stack. Each of the lens decks in the stack(s) is advanced by incremental advance means comprising a gear motor, or the like, driving a Geneva device. The motor and motor shaft are on a mounting which is biased with a spring into the rotation point of the Geneva device sprocket which provides for a zero tolerance condition.

Therefore, according to one aspect of the present invention there is provided a mixing chamber apparatus for use in a photographic printer of the type wherein light is used to transfer an image from a negative to a light sensitive medium, comprising:

(a) a frame;
(b) a plurality of walls slideably connected to said frame, said walls cooperatively arranged so as to form an interior volume;
(c) means, cooperatively connected to said frame and cooperatively engaging said walls, for moving at least one of said walls relative to said other walls, wherein the volume formed by said walls is continuously adjusted, whereby light delivered by the mixing chamber is maximized for the negative.

According to another aspect of the present invention there is provided a lens holder apparatus for a photographic printer of the type having a light source and an exposure station for holding light sensitive material, wherein an optical axis is defined by the path of light from the light source to the exposure station, comprising:

(a) a first shaft, said shaft being oriented generally parallel to a line normal to the mean plane formed by the exposure station;
(b) a plurality of concentric shafts, said concentric shafts being arranged and configured about said first shaft, wherein said concentric shafts are independently rotatable about said first shaft;
(c) advance means, cooperatively connected to said concentric shafts, for rotating said concentric shafts; and
(d) a plurality of deck means, cooperatively connected to said concentric shafts, for holding lens groups, each of said lens groups including one or more lenses to project an image onto the light sensitive material, wherein each of said deck means includes one or more first projecting positions defined by a lens group being extended into the optical axis, and one or more second projecting positions defined by no lens group being extended into the optical axis, whereby selective actuation of said advance means moves a corresponding deck means into said first projecting position.

According to still another aspect of the present invention, there is provided an apparatus of the type used to supply light sensitive web material to a platen in a photographic printer, comprising:

(a) a rod, wherein the circumference of said rod has a plurality of grooves formed therein;
(b) a first end plate, said first end plate having a first hole formed therethrough, said rod inserted through said first hole;
(c) first groove retention means, cooperatively connected to said first end plate, for engaging a groove formed in said rod, whereby said first end plate is firmly engaged to said rod when said groove retention means are actuated;
(d) a second end plate, said second end plate having a second hole formed therethrough, said rod inserted through second hole; and
(e) second groove retention means, cooperatively connected to said second end plate and biased a predetermined distance from said second plate along the axial direction of said rod, for engaging a groove formed in said rod, wherein said second end plate forces the supply of web material against said first end plate, whereby said web material is registered in the printer.

While the invention will be described with respect to a preferred apparatus and method, and with respect to particular components and devices used therein, it will be understood that the invention is not to be construed as limited in any manner by either such component or devices described herein.

These and various other advantages and features which characterize the invention are pointed out with particularity in the claims annexed hereto and forming a part hereof. However, for a better understanding of the invention, its advantages and objectives obtained by its use, reference should be had to the drawing which forms a further part hereof and to the accompanying descriptive matter, in which there is illustrated and described a preferred embodiment of the invention.

BRIEF DESCRIPTION OF THE DRAWING

Referring to the Drawing, wherein like numerals represent like parts throughout the several views:

FIG. 2 is a perspective view of the adjustable mixing chamber 24 of the printer 20 of FIG. 1;

FIG. 3 is a top view of the adjustable mixing chamber 24 of FIG. 2 with the volume maximized;

FIG. 4 is a top view of the adjustable mixing chamber 24 of FIG. 2 with the volume minimized;

FIG. 5 is a perspective view of a preferred carousel stack 35 of the printer 20 of FIG. 1;

FIG. 6a is a cross-sectional view of the stack 35 taken through line 6a—6a of FIG. 5;

FIG. 9 is a perspective view of the supply/take-up reel 39, 47 of printer 20 illustrated in FIG. 1;

FIG. 10 is a front view of the reel of FIG. 8;

FIG. 11 is a cross-sectional view of end plate 210 of the reel of FIG. 8 taken through line 11—11 in FIG. 9.

DETAILED DESCRIPTION OF THE PREFERRED EMBODIMENT

As mentioned above, the principles of this invention, apply particularly well to a printer device for exposing light sensitive material. This invention provides a more efficient and accurate exposure by utilizing an infinitely adjustable mixing chamber, one or more lens stacks in a spaced arrangement, and a referencing of the supply of light sensitive material. Preferably, a controller 50 (described further below) receives input from an operator of the printer and, alternatively, from the negative holder/mask to adjust the various components.

Figure 1:
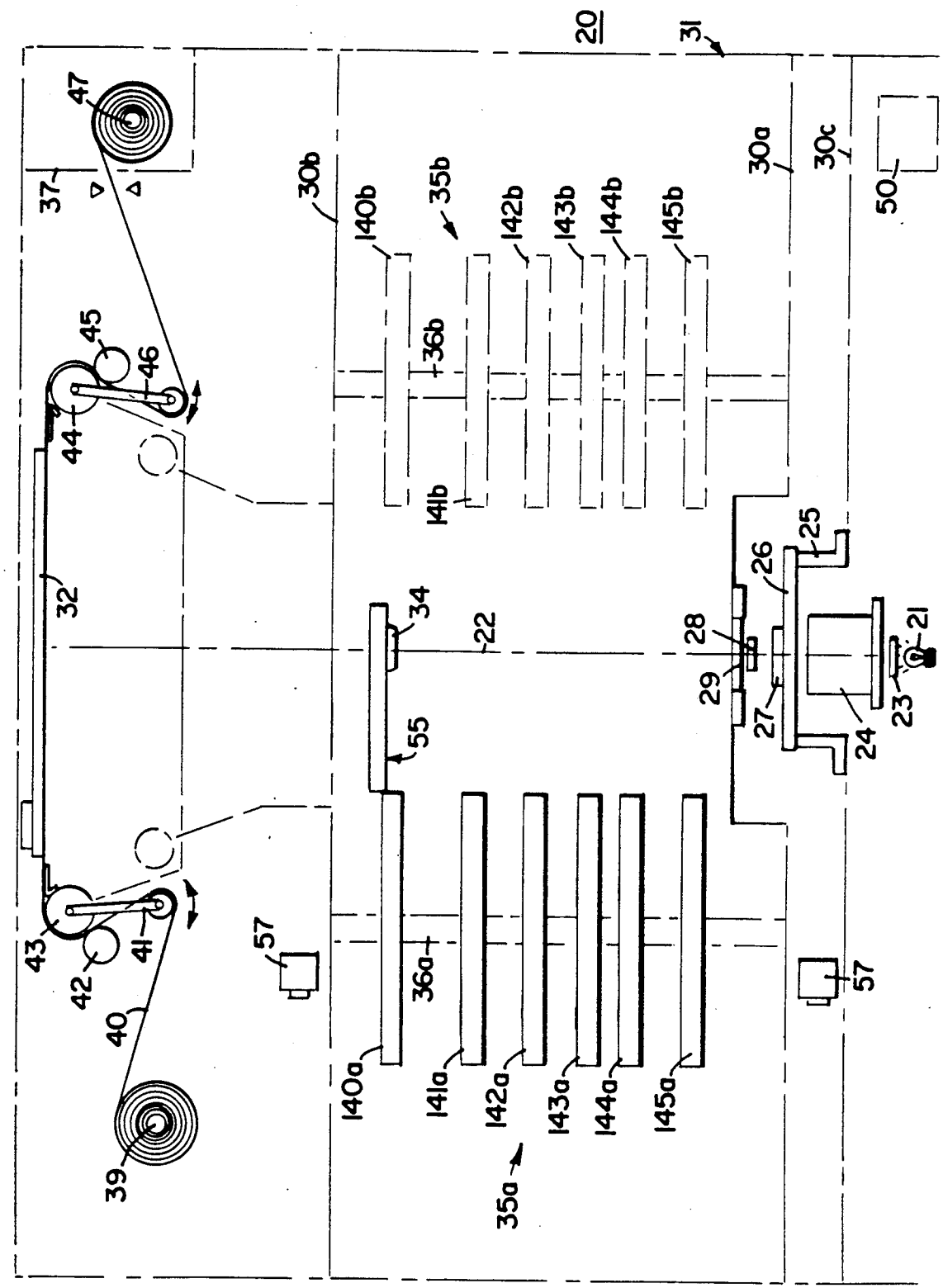
FIG. 1 is a diagrammatic representation of a printer constructed according to the principles of the present invention.

A diagrammatic illustration of a preferred embodiment of the present invention is illustrated in FIG. 1. The printer is shown generally at 20. Printer 20 includes a light source 21 which is preferably a white light source. As noted above, a white light source generally describes an illuminating source which provides a full spectrum of colors, thereby appearing to be white. The light source 21 provides illumination which is reflected along a light path indicated by the hatched line 22. The line 22 may be termed the optical center line of the printer 20. The line 22 extends from the center of the light source 21 to the center of the platen 32 (described below). The remaining components of printer 20 will next be described in relation to their preferred orientation and position along the optical center line 22.

Color filters 23 are interposed between the light source 21 and the adjustable chamber 24. Those skilled in the art will recognize that the purpose of the color filters 23 is to provide for a correction of chromacity for the negative and light sensitive material being utilized. Controller 50, is cooperatively connected to the color filters 23 and color sensor 28 to provide for a balanced exposure of the light sensitive material. The operation and control of the color filters 23 and color sensor 28 by controller 50 behaves in a known manner and is not a part of the invention described herein per se. Therefore, such operation will not be described in further detail. Those skilled in the art will recognize that color techniques such as white light, integration and video analyzing might be utilized, among others. Further, those skilled in the art will recognize that the printer 20 might also be used for black and white printing in which case color filters 23 and color sensor 28 might not be utilized. In the preferred embodiment, controller 50 is a microprocessor based device manufactured by Kodak of Rochester, N.Y., under the designation Accudata controller, although, innumerable other microprocessor devices and the like might be used.

Residing next along optical center line 22 is adjustable chamber 24. As noted above, the chamber provides a mixing of the light to provide a homogeneous mixture to the negative (not shown) held by the negative holder/mask 27. This aspect improves the exposure times and quality of the prints produced by printer 20. The mixing chamber 24 has an almost infinite adjustment range to correspond to variously sized negatives and/or negative masks 27 utilized in printer 20. However, in order to facilitate a clearer understanding of the preferred embodiment, description of adjustable chamber 24 will be deferred pending a more thorough discussion of the remaining components of printer 20.

Support members 30 are cooperatively connected to the walls 31 of printer 20. Support member 30c supports a turntable support member 25. Turntable support member 25 provides a base for turntable 26, and is preferably a round tube, sized and configured so as to permit the exit port of mixing chamber 24 to reside as close as possible to negative mask 27 without mechanical interference. Turntable 26 rotates so as to rotate the negative mask 27. This allows for a more economical use of paper 40 (e.g., when using 10 inch paper and printing an 8×10 photo, the image is normally aligned transversely to the longitudinal axis of the light sensitive medium 40, while wallet size prints are aligned with the longitudinal axis, as is well known in the art). As will be appreciated by those skilled in the art, walls 31 and support members 30 provide a light tight enclosure so as to properly provide a setting in which to expose light sensitive material 40. Similarly, while not explicitly shown, access doors (not shown) are provided in order to replace material, lenses, etc.

Turntable support member 25 is cooperatively attached to the support member 30c and provides a base on which turntable 26 may be located, such that the light source 21 illuminates the negative mask 27. Turntable 26 and negative mask 27 interact in a known manner, but preferably also provide for an automatic indication of the negative size. The indication generates a signal which is passed along to controller 50. The indication is preferably generated by Hall effect switches or microswitches (e.g., simply by providing a number and/or positioning of Hall effect switches, a unique code for different size masks may be implemented), although any other number of well known devices might be employed. Further, in the event that a web is used to transport a roll or series of negatives, an optical encoding scheme might be utilized, although numerous other methods might also be utilized as are well known in the art. Still further, the negative and the associated negative holder 27 may assume a wide variety of sizes such as 35 millimeter, 70 millimeter, etc.

Next, along the optical center line 22 is color sensor 28 described above. Shutter 29 is connected to controller 50 and provides for the lower portion 51 of the printer 20 to be light isolated from the upper portion 52 of printer 20 which contains the light sensitive medium 40. This allows for the light source 21 to be illuminated, thereby providing for the adjustment of the chromacity of the negative, while not exposing the light sensitive material 40. When open, shutter 29 provides a path for the image from the negative to be projected upward onto the light sensitive material 40 held by the platen 32. Shutter 29 is preferably actuated by controller 50, but may also provide for manual activation.

Platen 32 is preferably a vacuum platen so as to hold the light sensitive material 40 in a uniformly flat manner during exposure. Platen 32 thereby acts as an exposure station. An example of one such platen is disclosed in commonly assigned patent application Ser. No. 07/444,813, titled "Vacuum Platen for use in Printer" incorporated herein by reference. The platen 32 preferably utilizes a series of grooves (not shown) which extend through one edge of the platen 32. Vacuum means 53 draws air through the grooves drawing the light sensitive material 40 onto the platen 32. The opening of the grooves through one edge tends to maintain the vacuum at a more constant value even as the light sensitive material 40 covers the entire surface of the platen 32.

Located on either side of optical center line 22 between platen 32 and shutter 29 are lens stacks 35a and 35b. Lens stacks 35 rotate about their respective axis 36a and 36b so as to interpose a lens 34 within the optical center line 22, thereby focusing and projecting the image from the negative onto the light sensitive medium 40 held by platen 32. A more thorough discussion of the lens stacks 35 will be deferred pending completion of the description of the components of printer 20 and of the adjustable mixing chamber 24.

The light sensitive medium supply reel 39 stores the supply of web material 40. The web material 40 is threaded through rollers 42 and 43 with take-up roller 41 being pivotable about the axis of roller 42. The web material 40 extends across the face of platen 32 and around rollers 44 and 45. The web material 40 then extends around second take-up roller 46, through a cutter assembly 38, and into an exposed accumulation area 48 through interior wall 37. Take-up roller 47 resides within exposed accumulation area 48. A further description of the supply roller assembly 39 will also be deferred.

Bale arms 41 and 46 are arranged and configured to minimize any slack of web material 40 and are preferably biased toward one another. Bale arm 41 interacts with a braking device cooperatively connected to supply 39 (e.g., when too much slack exists in the material 40, then the bale arm 41 is biased toward bale arm 46, activating the brake on supply 39; similarly when there is a need for more material, bale arm 41 swings toward supply 39 which releases the brake). Rollers 42, 43, 44 and 45 provide for a constant advancement and tension on the material 40 across platen 32. Take-up reel 47 is driven by a motor (not shown) to collect the exposed material 40. Preferably, interior wall 37 provides a light proof enclosure, so that exposed material may be removed without opening the remaining portions of the printer 20.

Turning now to FIG. 2, the adjustable mixing chamber 24 will next be described. Adjustable chamber 24 is preferably comprised of a frame 100, a ring 101, a screw assembly 102 and walls 103. The ring 101 is cooperatively connected to the frame/base 100. Preferably, such connection includes a series of bushings 104 around the outer periphery of the ring 101, wherein the bushings 104 overlap a portion of the outer edge 101b of the ring 101. The bushings may be constructed of Delrin ® or some other hard non-abrasive plastic. Preferably, the ring 101 is rotatable about its center of rotation over the base 100 without undue force. The ring 101 has a series of first grooves or slots 105a–105d formed therethrough which begin proximate the inner edge 101a of the ring 101 and extend in an arc toward the outer edge 101b of the ring 101.

The walls 103 are preferably comprised of a first rectangular portion 114 and a second generally trapezoidal portion 115. The two portions 114 and 115 are one L-shaped piece and generally form a right angle to one another. The first portion 114 defines a first plane which is generally perpendicular to the plane formed by the ring 101. The second portion 115 defines a second plane which is generally parallel to the plane formed by the ring 101. The intersection of the two planes generally defines a line. Formed through the second portion 115 of wall 103 are two second slots 116 preferably residing at a 45 degree angle relative to the defined line. Slideably inserted in the slots are second guide members 117 fixedly attached to the frame 100. Delrin ® is also preferably used as the second guide members 117. Also cooperatively attached to the second portion 115 of wall 103 is first guide member 110 which cooperatively extend through slots 105 of ring 101. First guide member 110 is also preferably Delrin ® The arrangement of the second portions 115 of walls 103 residing between base 100 and ring 101, as well as the arrangement of guide members and slots, slideably secures the walls 103 within the mixing chamber 24 apparatus.

The interaction of the second guide members 117 and the second slots 116, as well as the first grooves 105 and first guide members 110 provide for the forward and back movement of the walls 103 relative to the inner edge 101a of the ring, as will become apparent upon a further description of the screw assembly 102 below.

The four walls 103 are arranged and configured such that a side edge of each wall 103 is proximate the face of an adjacent wall 103. For example, a side edge of wall 103a is proximate the interior face of wall 103b. This orientation daisy chains around the volume formed by the four walls 103a–103d. Therefore, each plane formed by a wall 103 is generally normal to the planes formed by the adjacent walls 103.

The walls 103 are preferably constructed of Alzak ®, but any polished aluminum might be used. Those skilled in the art will recognize that any highly reflective material might similarly be used to mix the light.

Screw assembly 102 is comprised of a threaded member or rod 106, a nut 107 threadably inserted on the rod 106, and a connecting member 108 from the nut 107 to the ring 101. Screw assembly 102 further includes a stepper motor 109. Actuation of motor 109 moves the nut 107 along the longitudinal axis of the threaded member 106 thereby pivoting the ring 101 about its axis via the connecting member 108 which is pivotal about its connection to both the ring 101 and the nut 107.

The rotation of the ring 101 operates to move the walls 103 backward and forward relative to the inner periphery 101a of the ring 101 by forcing the first guides 110 along the arc formed by the first slots 105. The angle of the second slots 116 keep the walls 103 centered about the optical center line 22 as the volume of the mixing chamber 24 increases/decreases, while also keeping the wall 103 edges proximate the adjacent wall 103 face.

The base 100 of the chamber 24 is oriented toward the light source 21. Therefore, the cross sectional area (or transverse slice of the longitudinal volume, wherein the longitudinal axis of the volume is considered the optical axis 22) of the walls 103 is adjusted in accordance with the mask 27 to maximize and mix the light through the negative. Those skilled in the art will recognize that while a screw assembly 102 is illustrated in the preferred embodiment, a lever (not shown) or crank (not shown) might be utilized to turn the ring 101 about its axis, either manually or automatically.

Additionally, while in the preferred embodiment, a sensor 120 is utilized so as to provide a reference position to controller 50, other means might be utilized. In order to provide controller 50 with a reference position, the ring 101 advances so as to minimize the cross sectional area (FIG. 4) until the sensor detector 102a senses the presence of detector pin 120b. While preferably sensor 120 comprises a Hall effect switch, a microswitch or any other number of devices known in the art might be utilized.

Figure 6B:
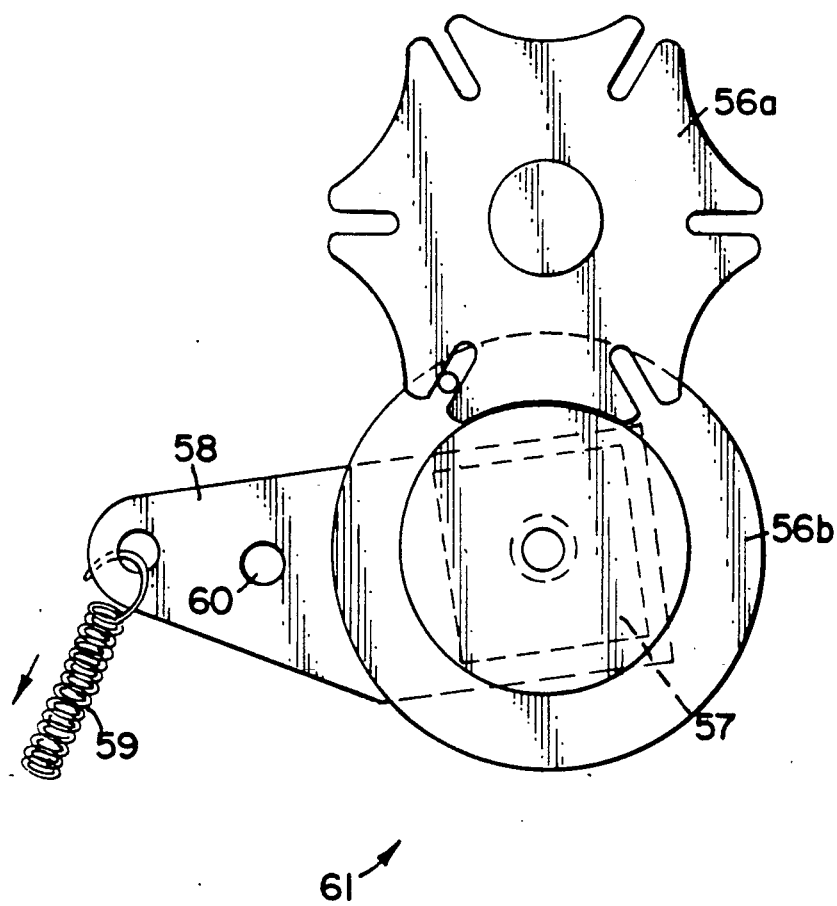
FIG. 6b is a plan view of a motor mounting of the carousel stack 35 of FIG. 5.

Turning next to FIGS. 5, 6a and 6b, there is illustrated a preferred carousel stack 35. The stack 35 includes a solid shaft 125. Solid shaft 125 is supported at its top and bottom by support members 30a and 30b and is preferably rigidly attached at the top by a set screw (not shown) or some other well known means. Preferably, the shaft 125 is steel or some other material which is capable of supporting the remaining portions of stack 35. Arranged concentrically about shaft 125 are concentric hollow shafts 126-131. The concentric shafts 126-131 are preferably tubes. The concentrical shafts 126-131 are arranged such that there are three shafts concentrically arranged about the top portion of shaft 125 and three concentric shafts arranged about the bottom portion of shaft 125. The shafts 126-131 include press fit bearings (not shown) against interior shoulders (not shown) and are sized and arranged accordingly. In the preferred embodiment, the solid shaft 125 has a one inch diameter, while shafts 128 and 129 have a one and ¼ inch interior diameter. Shafts 127, 130 have a 1 and ½ inch interior diameter, while shafts 126, 131 have a 1 and ¾ inch interior diameter. Such dimensions are provided by way of illustration and should not be construed as limiting the present invention.

The upper three concentric shafts 126-128 extend upwardly about the solid shaft 125 and are cooperatively connected to incremental advance means 61 (preferably individual Geneva devices 56 actuated by gear motors 57). The lower three concentric shafts 129-131 extend downwardly and are cooperatively connected to corresponding incremental advance means. Therefore, the concentric shafts 126-131 are each arranged and configured wherein actuation of an individual incremental advance means 61 results in rotation of the corresponding concentric shaft. While a single motor 51 is illustrated at the top and bottom of shaft 51 in FIG. 1, actually the number of motors 51 correspond to the number of decks 140-145. Additionally, the remaining incremental advance means 61 prohibit the other concentric shafts 126-131 from rotating. In this manner, individual concentric shafts 126-131 are rotatable about the solid shaft 225 in a controlled and "isolated" manner from the remaining concentric shafts 126-131.

In order to further stabilize the decks 140-145, the concentric shafts 126-131 are split longitudinally proximate the location where the deck 142-145 is attached. The hub portion 52 is preferably screwed together (best seen in FIG. 7) and includes pins 161 which extend into the concentric tube and a split interior bushing (not shown). When the hub portion 54 is fastened together, it tightens about the concentric shaft 126-131 locking onto the bushing, thereby compressing the shaft and the bushing about the "next inwardly" shaft. Therefore, a zero clearance condition is achieved between the concentric shafts 126-131 while still being rotatable. This is required in order to maintain sharp exposures. Proximate the hub 54, a bushing (not shown) may be used between the hub 54 and the concentric shafts 126-131.

As noted, each of the concentric shafts 126-131 are cooperatively connected to a deck 140-145. In the preferred embodiment, the decks 140-145 are hexagon in shape and may include cutout portions (not shown) to lighten the weight associated with the deck 140-145. Preferably, the decks 140-145 are constructed of steel, or they may alternatively be cast aluminum in two halves (best seen in FIG. 7).

Radiating from about the periphery of each deck 140-145 are a plurality of lens holding means or lens carriers 55 for holding lenses 34 used to focus the image from the negative onto the light sensitive medium 40. The lens carriers 55 are preferably constructed of a light but strong material, such as aluminum, having flanges 62 (best seen in FIGS. 5 and 6a), or turned down edges in order to strengthen the material. The lens carriers 55 are cooperatively connected to the deck 140-145 in a known manner, such as bolts and nuts, rivets or other well known means (not shown).

As noted, the decks 140-145 are preferably true hexagons in shape, wherein incrementing the deck 60 degrees about its axis of rotation 36 provides a different face of the hexagon proximate the optical center line 22. In this manner, by providing for at least one hexagon face to remain without a lens carrier 55, a single lens carrier 55 from one of the plurality of deck levels may be extended into the optical light path 22, while the remaining lens carriers 55 remain out of the optical light path 22. In this manner, a single stack 35 may provide for 12 lens carriers 55 (i.e., twelve groups of lenses) to be selectively moved into the optical light path 22 by a single 60 degree (plus or minus) rotation of any of the decks 140-145.

While the preferred embodiment utilizes six levels of decks 140-145 and a hexagon shape, those skilled in the art will appreciate that any number of decks and shapes may be utilized in the present invention. Additionally, a second lens stack 35b (best seen in FIGS. 1 and 4) may be utilized in combination with one another so as to further increase the availability of number of lenses 34 in the preferred embodiment.

Figure 7:
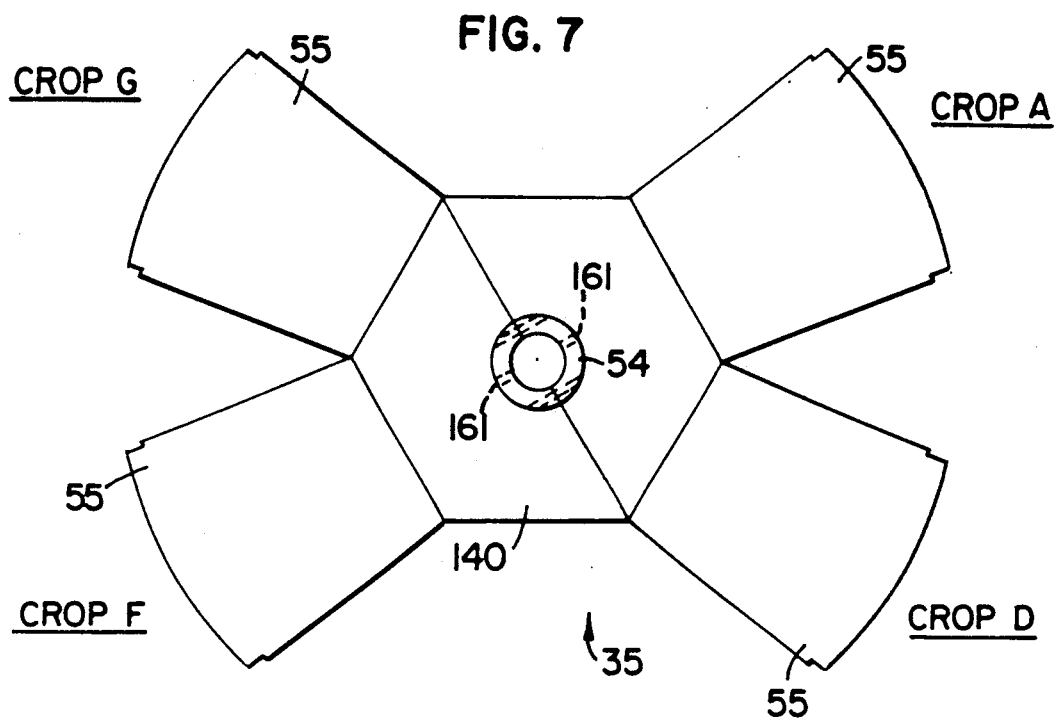
FIG. 7 is a diagrammatic top plan view of the lens stack 35 of FIG. 5.
Figure 8:
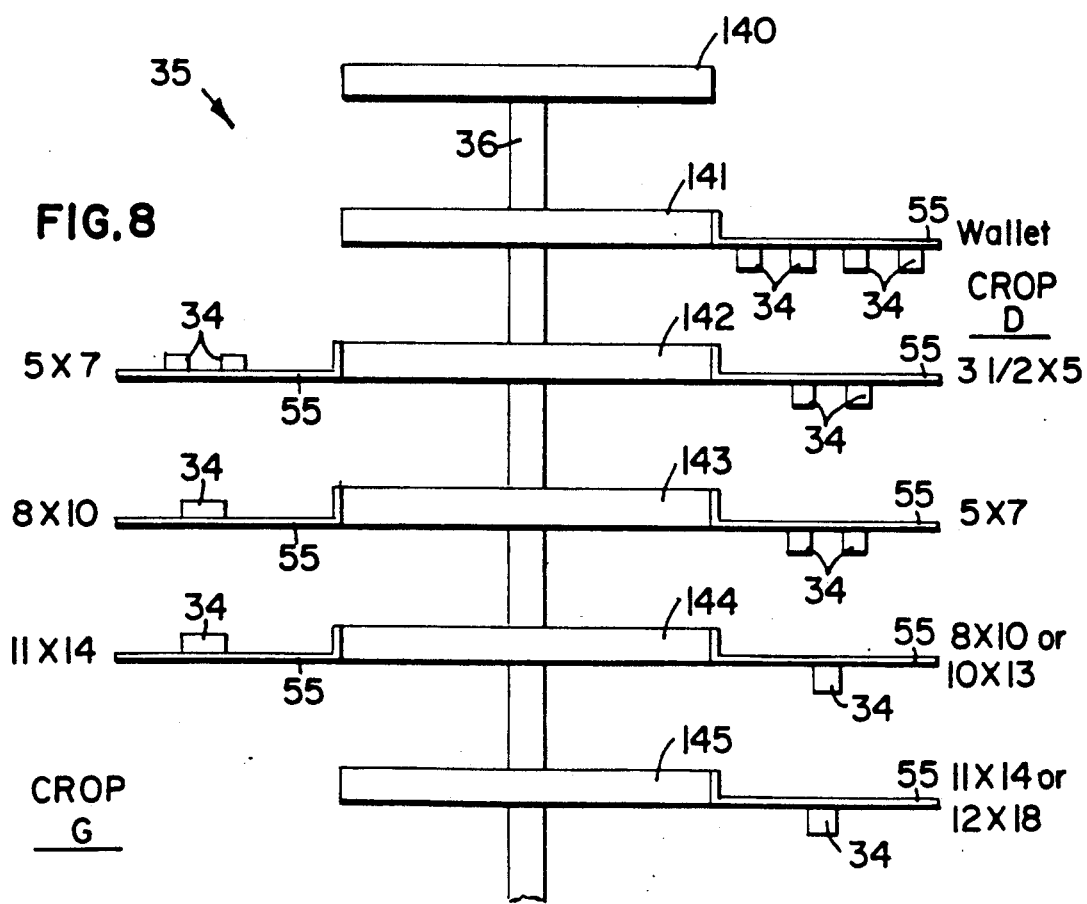
FIG. 8 a diagrammatic cross-sectional view of the lens stack 35 of FIG. 7.

Referring next to FIGS. 7 and 8, by way of example, each lens carrier 55 aligned about a face of the stack 35, may be provided for a different size negative. Referring to FIG. 7, there is illustrated four lens carriers 55 located about an example deck 140. Each lens carrier 55 in the level corresponds to a different "crop." For example, referring now to FIG. 8, crop D may include different lenses 34 on each deck level, wherein the lenses correspond to different sizes of prints desired to be made from that size negative. Therefore, in operation, the stack 35 would be rotated such that crop D lenses were within the 60 degree rotation into the optical center line 22 prior to printing. In this manner, each of the various lenses 34 may be rotated into the optical light path 22 upon a single 60 degree rotation of the appropriate deck 140-145.

The lenses 34 are well known in the art and so will not be described in detail herein. The lenses preferably used are of the "package printer" or multiple image configuration type, although single image lenses are also used. Further, while not shown explicitly herein, the lenses 34 are mounted on boards (not shown) which are cooperatively connected to the lens carriers 53 by means of a threaded stud and nuts. By varying the nuts along the stud, the lenses may be focussed. Further, while a single designation 34 is used to denote the lenses, those skilled in the art will appreciate upon the foregoing description that lenses of varying types are preferably used.

FIG. 6b illustrates a preferred incremental advance combination of gear motor 57, Geneva device 56, mounting bracket 58 and biasing means 59. Preferably, mounting bracket 58 has a pivot point 60. Biasing means 59 tends to rotate the motor 57, which is mounted on mounting bracket 58 firmly into the sprocket 56a of Geneva device 56. This provides for an minimization of tolerance between the two Geneva device elements 56a, 56b and provides a positive, repeatable advancing of the lens carriers 55 into the light path 22.

Referring next to FIGS. 9, 10 and 11, a light sensitive medium supply reel 39, 47 is illustrated. The reels 39, 47 are similar in construction, such that only reel 39 will be described in detail. Reel 39 is comprised of two end plates 209 and 210 as well as roll or tube 211. The first end plate 209 includes a interlocking mechanism 219 to cooperatively engage the grooves 212 formed in the roll 211. As those skilled in the art will appreciate, grooves 212 provide for a sizing of the end plates 209, 210 to accommodate various sized widths of light sensitive web material 40. The interlocking mechanism 219 includes a spring loaded locking mechanism which cooperates with grooves 212. First end plate 209 provides the registration against which the light sensitive material 40 is biased.

Second end plate 210 is comprised of first plate 213, second plate 214, bias means 215 and locking assembly 216. First end plate 213 engages a stand-off 216 in which is threadably inserted a bolt and washer combination 217. Second plate 214 includes holes formed therethrough in which bushing 218 is inserted. Stand-off 216 is then inserted through the bushing 218. Biasing means 215 preferably include springs which tend to provide an incremental distance between the first end plate 213 and second end plate 214. The distance between the two plates 213, 214 are arranged and configured such that standard nominal widths of paper tend to bias the straight springs 215. Second plate 210 further includes a locking mechanism 219 similar to that described for end plate 209. In this manner, the web material 40 is registered against first end plate 209 to eliminate wavering.

Figure 12:
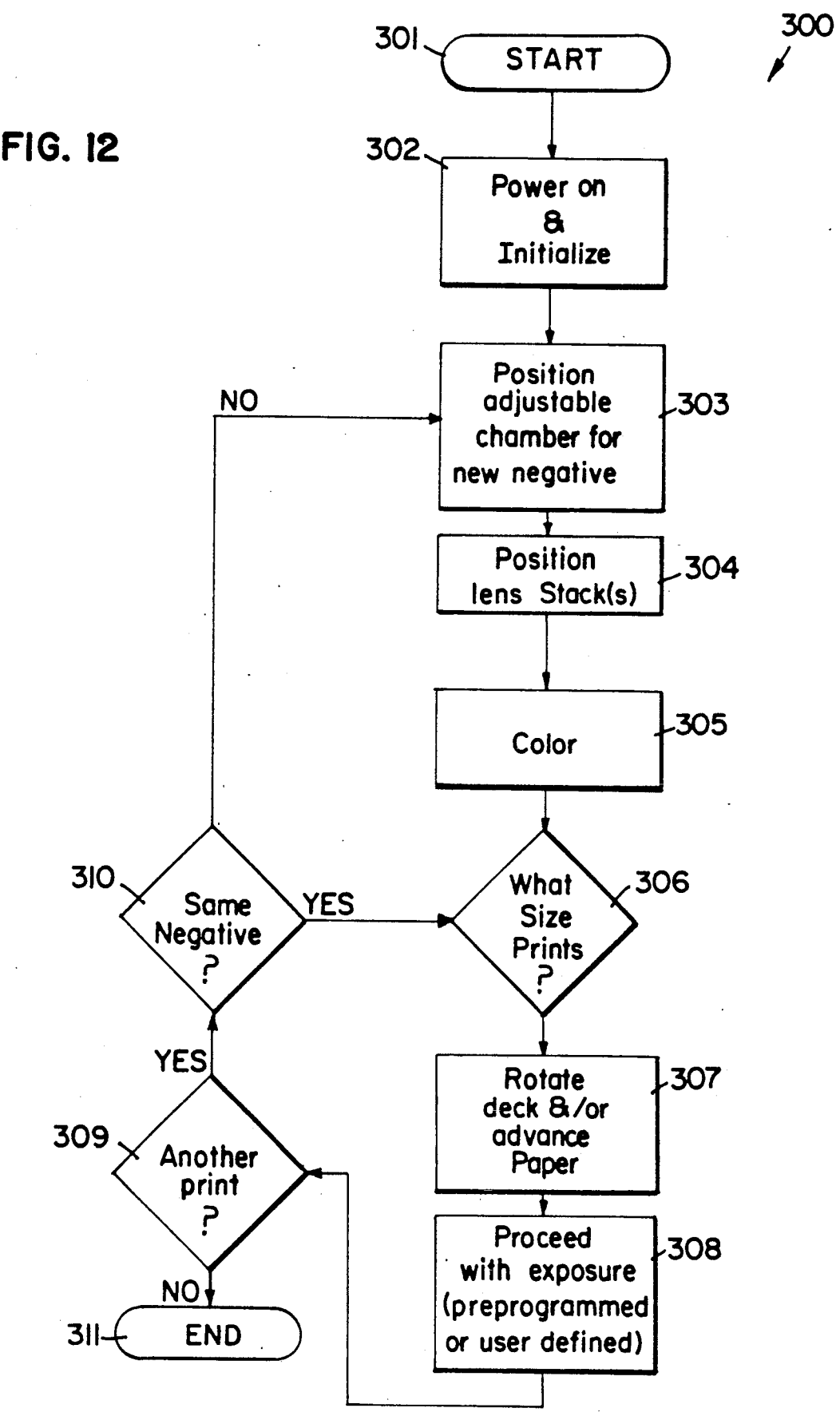
FIG. 12 is a block diagram of the functional steps utilized by controller 50 of the printer 20 illustrated in FIG. 1.

Referring next to FIG. 12, in operation, the controller 50 provides for the functional steps illustrated in FIG. 10. The logic flow diagram of an embodiment to the program logic is shown generally at 300. The logic flow diagram 300 illustrates the steps taken to actuate the various components of printer 20.

Although the controller 50 will be characterized as "proceeding" from logical block to logical block, those skilled in the art will appreciate that programming steps are being acted on by controller 50.

Therefore, in operation, controller 50 starts at block 301. Controller 50 then proceeds to block 302 to initialize registers and memory and load the program logic from E-prom (not shown) or some other storage element. Such operation is well known to those skilled in the art and so will not be described further herein. Further, light source and vacuum are turned on simultaneous with the activation of controller 50.

Next at block 303, upon an operator placing a roll of film or individual negative 37 into the negative holder 26, the adjustable chamber 24 is adjusted to the appropriate size.

Next at block 304 the stack(s) 35 is moved into an optimum position to print that particular size negative 37 by moving the appropriate group of "crop" lenses 34 into a position wherein a 60 degree rotation will move individual groups of at least one lens 34 into the optical light path 22.

Proceeding to block 305, the appropriate color correction filters are inserted into the light path.

At block 306, the operator either manually enters information regarding the size of desired prints or the information is determined by controller 50.

Proceeding to block 307, appropriate size lenses 34 are positioned and the light sensitivity material is properly advanced by rollers 41-43 and 44-46.

Next at block 308, controller 50 opens the shutter 29 to proceed with exposure.

Next at block 309, the controller inquires if another print is required. If not, the controller proceeds to block 311 to end. If another print is desired, the controller inquires if the same negative is to be exposed at block 310. If the same negative is to be exposed, the controller 50 proceeds to block 306. If a different negative is to be used the controller proceeds to block 303.

It will be apparent to those skilled in the art that no attempt has been made to correlate each and every lens carrier 55 to those illustrated. Further, those skilled in the art will appreciate that while describing the preferred embodiment, relative terms such as up and down are used herein, such terms are merely descriptive of a preferred orientation and should not be construed as limiting.

It is to be understood that even though numerous characteristics and advantages of the present invention have been set forth in the foregoing description, together with details of the structure and function of the invention, the disclosure is illustrative only and changes may be made in detail, especially in matters of the shape and arrangement of the various components, supporting hardware and software routines, and to the full extent indicated by the broad general meaning of the terms in which the appended claims are expressed.

We claim:

1. A photographic printer comprising:
   (a) a light source;
   (b) an adjustable mixing chamber, including:
      (i) a plurality of walls, said walls having an interior face, a side edge and a top edge, and wherein each of said side edges is located proximate an interior face of an adjacent wall; and
      (ii) drive means, cooperatively connected to said walls for moving said walls relative to one another;
   (c) a negative holder for holding a negative having an image to be transferred to a light sensitive medium, the cross sectional area formed by said top edges of said mixing chamber being adjusted by said drive means to correspond to the negative;
   (d) a lens holder for focusing the image onto the light sensitive medium; and
   (e) an exposure station for holding the light sensitive medium.

2. The printer of claim 1, wherein said lens holder includes a plurality of concentric shafts, each of said shafts being seprately rotatable, and a plurality of lens carrier means, cooperatively connected and corresponding to said shafts, for selectively holding one or more lenses to focus the image onto the light sensitive medium dependent upon the rotation of said corresponding shaft.

3. The printer of claim 1, further comprising a supply reel for the light sensitive medium, said supply reel being arranged and configured to register the light sensitive material, whereby wavering of undersized dimensioned light sensitive medium across said exposure station is minimized.

* * * * *